UNITED STATES PATENT OFFICE.

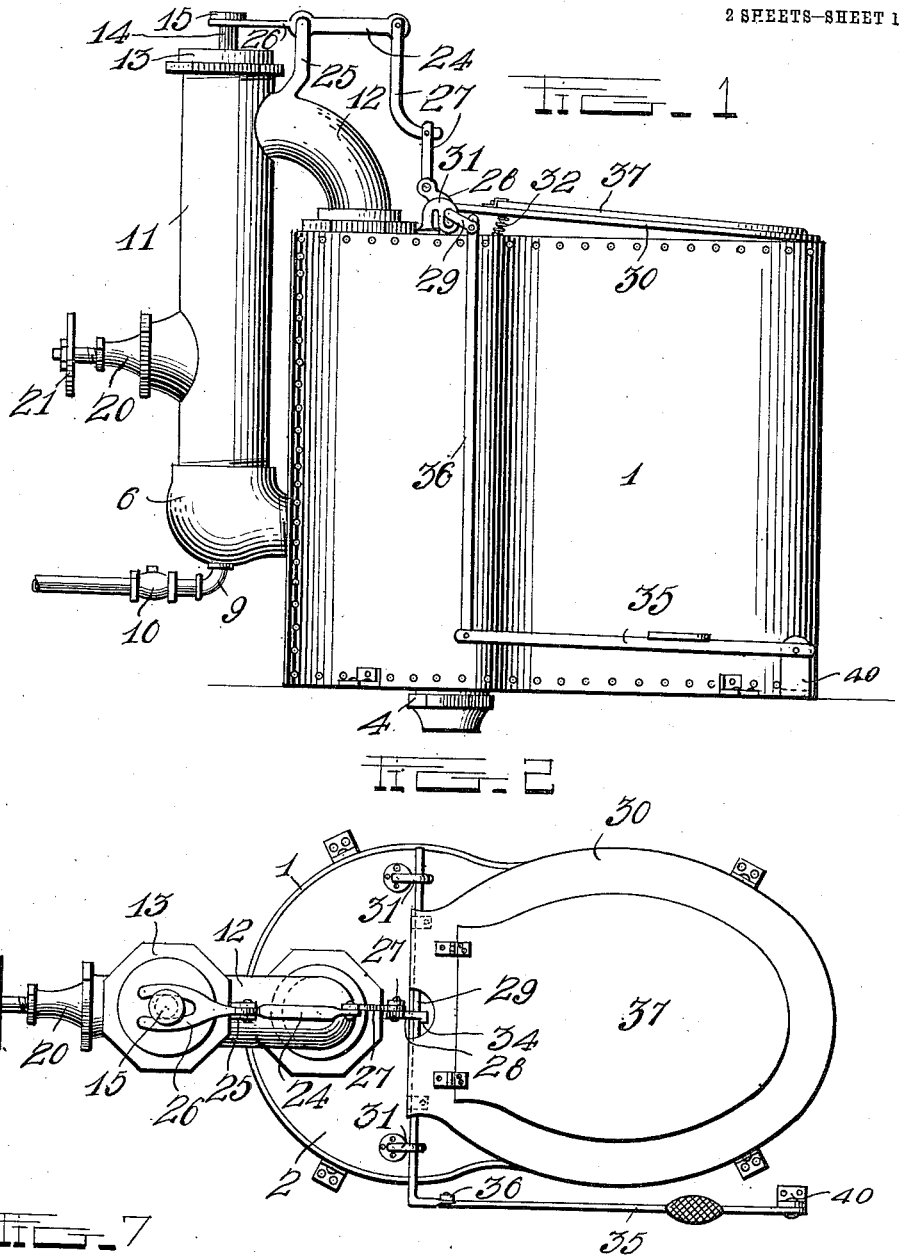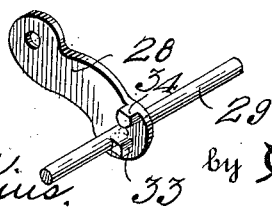

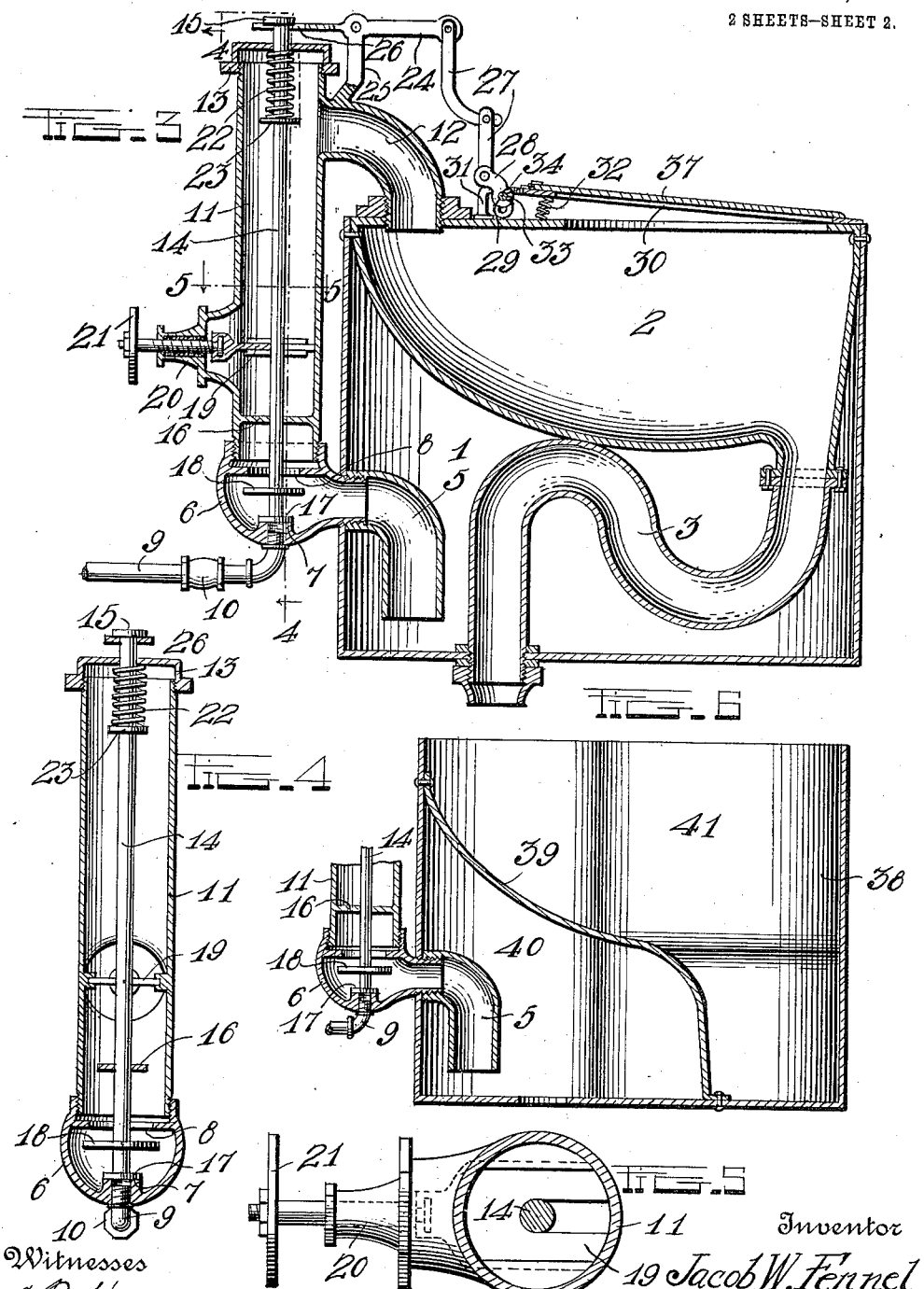

JACOB W. FENNEL, OF NEWBURGH, NEW YORK.

COMBINED FLUSH-TANK AND BOWL.

1,009,231.  Specification of Letters Patent.  Patented Nov. 21, 1911.

Application filed June 27, 1910. Serial No. 569,074.

*To all whom it may concern:*

Be it known that I, JACOB W. FENNEL, a citizen of the United States, residing at Newburgh, in the county of Orange and State of New York, have invented certain new and useful Improvements in a Combined Flush-Tank and Bowl; and I do declare the following to be a full, clear, and exact description of the invention, such as will enable others skilled in the art to which it appertains to make and use the same.

This invention relates to improvements in combined flush tanks and closet bowls.

One object of the invention is to provide a flush tank adapted to receive a bowl and having means whereby the water in the tank may be automatically forced into the bowl.

Another object is to provide a tank and bowl of this character having an improved construction of flush valve and means whereby the same may be opened by pressure on the seat or when the seat is opened or by foot power.

With the foregoing and other objects in view, the invention consists of certain novel features of construction, combination and arrangement of parts as will be more fully described and particularly pointed out in the appended claims.

In the accompanaying drawings, Figure 1 is a side view of my improved combined flush tank and bowl; Fig. 2 is a top plan view; Fig. 3 is a central vertical longitudinal section; Fig. 4 is a vertical section through the casing of the flush valve on the line 4—4 of Fig. 3; Fig. 5 is a horizontal section of the same on the line 5—5 of Fig. 3; Fig. 6 is a vertical longitudinal section of a modified form of tank; Fig. 7 is a detail perspective view of the means for operating the device when the seat is raised.

Referring more particularly to the drawings 1 denotes a tank which may be of any suitable size and shape and constructed of any suitable material, said tank being adapted to be closed to form an air tight compartment in the manner hereinafter described. In the preferred form of the invention I provide a bowl 2 which is arranged in the upper portion of the tank and the upper edge of the latter is secured to the bowl in any suitable manner to form an air tight closure. The waste pipe of the bowl may be connected with any suitable form of trap which may be located either in the tank or outside of the tank and is shown in the present instance in the form of an S trap 3 arranged in the tank below the bowl and extending through the bottom of the tank. The end of the trap where the same passes through the bottom of the tank is provided with suitable packing or washers and a tubular jam nut 4 is screwed onto the projecting outer end of the trap whereby the washers or packing is clamped against the bottom and around the end of the trap thus forming a water and air tight closure where the trap passes through the tank. The lower end of the tubular clamping nut 4 is reduced and is adapted to set into the upper end of the soil pipe (not shown). Arranged in the tank preferably at the rear side of the same is a downwardly projecting water inlet and discharge pipe 5 which extends to near the bottom of the tank as shown. Adapted to be screwed into the outer upper end of the pipe 5 is a valve casing 6 in which is arranged valve seats 7 and 8. With the valve seat 7 is connected a water supply pipe 9 in which is arranged a check valve 10 the purpose of which will be hereinafter described.

The valve casing 6 is provided with an upwardly projecting extension 11 which preferably has a screw threaded engagement at its lower end with the valve seat as shown. On the upper end of the extension 11 is formed a flush pipe 12 the free end of which is connected with the upper rear portion of the bowl in any suitable manner whereby the bowl will be flushed by the water passing through said flush pipe. The upper end of the extension 11 of the valve casing 6 is preferably closed by a cap 13 which is screwed onto the upper end of the extension as shown.

Arranged in the extension 11 is a valve stem 14 the upper end of which projects and works through an aperture in the cap 13 and is provided with a head 15. The lower portion of the valve rod 14 works through a guide 16 arranged in the lower portion of the extension 11 and on the lower end of the valve stem is secured a water inlet valve 17 which is adapted to engage the seat 7 in the casing 6 and a flush valve 18 which is adapted to engage the seat 8 in said casing. The valves 17 and 18 are so arranged on the valve stem that when the passage through the valve seat 7 is closed the passage through the valve seat 8 is open and when the latter passage is closed the passage in the valve seat 7 will be open.

In the extension 11 of the valve casing near the lower portion thereof is arranged a horizontally disposed gate valve 19 the stem of which projects through a suitable stuffing box 20 arranged on one side of the extension 11 as shown. The outer end of the stem of the valve 19 is provided with an operating head 21 whereby the valve may be moved back and forth across the extension 11 to open and close the same to a greater or less extent thereby permitting more or less water to flow through the extension 11 and flush pipe 12. The valve 19 is provided with a slot or notch through which the valve stem 14 extends. The valve stem 14 is normally depressed and the valve 17 thereon held down into tight engagement with the seat 7 thereby closing the passage through said seat and preventing water from flowing into the tank, by means of a coiled spring 22 which is arranged on the upper portion of the valve stem 14 between a stop collar 23 secured thereto and the inner side of the cap 13. By thus arranging the water controlling valve the water entering the tank through the pipe 5 will compress the air in the upper portion of the tank so that when the water inlet valve 17 is closed and the flush valve 18 opened said compressed air will force the water out of the tank back up through the pipe 5 and valve casing 6, through the valve seat 8 and extension 11 into the flush pipe 12 from which it enters and flushes the bowl.

In order to automatically open the flush valve 18 and thus permit the discharge of water from the tank into the bowl I provide a valve operating mechanism which is here shown and preferably consists of a lever 24 pivotally mounted in a bearing bracket 25 formed on the flush pipe 12. The rear end of the lever 24 is forked or bifurcated as shown at 26 and said bifurcated end is adapted to engage the head 15 of the valve stem. The opposite end of the lever 24 is connected by links or connecting rods 27 to a short lever 28 which is loosely mounted on a rock shaft 29 which forms the hinge pin of the seat 30 of the bowl and which has a vertically moving and pivotal connection with bearing brackets or stationary hinge members 31 secured to the top of the bowl or tank as shown. The rear portion of the seat 30 is preferably held up a slight distance above the top of the bowl or tank by coiled springs 32 whereby when pressure is applied to the seat the rock shaft or hinge pin 29 will be forced downwardly with the rear end of the seat thereby drawing down on the connecting rods 27 thus rocking the lever 24 in the proper direction to cause the bifurcated outer end therefor to raise the valve stem 14 which will close the valve 18 and open the valve 17 thereby permitting water to flow into the tank thus compressing the air therein in the manner described. As soon as pressure is relieved from the seat the spring 22 on the valve stem 14 will force the latter downwardly thereby closing the water inlet valve 17 and opening the flush valve 18 which will permit the compressed air in the tank to force the water therein outwardly through the pipe 5 and valve casing 6 and extension 11 and through the flush pipe 12 into the bowl as hereinbefore described. After the water has thus been discharged from the tank the same will remain empty until pressure is again applied to the seat or the valves otherwise operated.

In order to provide for the flushing of the bowl without applying pressure to the seat, as for instance, when the seat is raised and any material placed in the bowl to be flushed therefrom, I provide a suitable valve operating mechanism consisting of a lug or projection 33 formed on the rock shaft 29 in position to engage a similar lug or projection 34 formed on the lever 28 whereby when the seat is raised and the shaft 29 thereby rocked the lug 33 on said shaft will engage the lug 34 on the lever 28 thus rocking the same and forcing the connecting rods 27 downwardly which will rock the lever 24 and thus open the water inlet valve and close the flush valve whereby the tank will fill. When the seat is again lowered and pressure removed from the valve stem 14 the spring 22 will close the inlet valve and open the flush valve to permit the water to pass into the bowl as hereinbefore described.

In addition to the means for operating the valve by the movement of the seat I also provide means whereby said valves may be operated by foot power, said means comprising a treadle 35 which is pivotally connected at one end to a bracket 40 secured to the floor near the forward side of the tank and projects back along the side of the tank and is connected at its rear end to an operating rod 36 the upper end of which is connected to the adjacent downwardly curved end of the rock shaft 29 whereby when said treadle is depressed the rock shaft 29 will also be depressed and the parts operated in the same manner as when pressure is applied to the seat. One end of the seat member 30 slidingly rests upon the upper front edge of the bowl 2 and its rear end is rigidly secured to and bears upon the shaft 29, and it will be observed that when the foot treadle 35 is depressed the seat member will also be depressed and simultaneously operated to cause the flushing of the bowl in the manner described.

The seat 30 is preferably provided with a suitable cover 37.

The check valve 10 is preferably provided in the water supply pipe 9 to prevent the pressure of air in the tank from forcing the water therein back through the inlet pipe should the pressure in said pipe be reduced by drawing the water therefrom at another point or from any other cause.

While I have herein shown and described the preferred form of my invention as having the bowl arranged and secured in the upper portion of the tank thus forming a compressed air and water space below the bowl I may, if desired, provide a tank 38 as shown in Fig. 6 of the drawing in which is arranged a suitably shaped partition 39 whereby the tank is separated into a lower compressed air and water compartment 40 and an upper bowl receiving compartment 41 into which is adapted to be placed the usual form of bowls now in use. The form of tank shown in Fig. 6 is provided with the same arrangement of water inlet and discharge pipe and water controlling valves as shown and described in the preferred form of the invention.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. The combination of a tank, brackets mounted thereon having vertical slots therein, a rock shaft mounted in said slots having a radially projecting lug, a crank arm loosely mounted on the rock shaft and provided with a laterally projecting lug in the path of the radially projecting lug of the rock shaft, an inlet valve, and connections between the inlet valve and crank arm whereby the inlet valve is opened when the seat is raised.

2. The combination of a tank, brackets mounted thereon having vertical slots therein, a rock shaft mounted in said slots having a radially projecting lug, a crank arm loosely mounted on the rock shaft and provided with a laterally projecting lug in the path of the radially projecting lug of the rock shaft, a flush valve, and connections between the flush valve and crank arm whereby the flush valve is closed when the front of the seat is raised and opened when the front of the seat is lowered.

In testimony whereof I have hereunto set my hand in presence of two subscribing witnesses.

JACOB W. FENNEL.

Witnesses:
 PEARL FENNEL,
 NETTIE FENNEL.

---

Copies of this patent may be obtained for five cents each, by addressing the "Commissioner of Patents, Washington, D. C."